Oct. 7, 1941.  G. GOEBEL ET AL  2,257,740
METHOD AND APPARATUS FOR COATING ARTICLES
Filed July 2, 1937  9 Sheets-Sheet 1
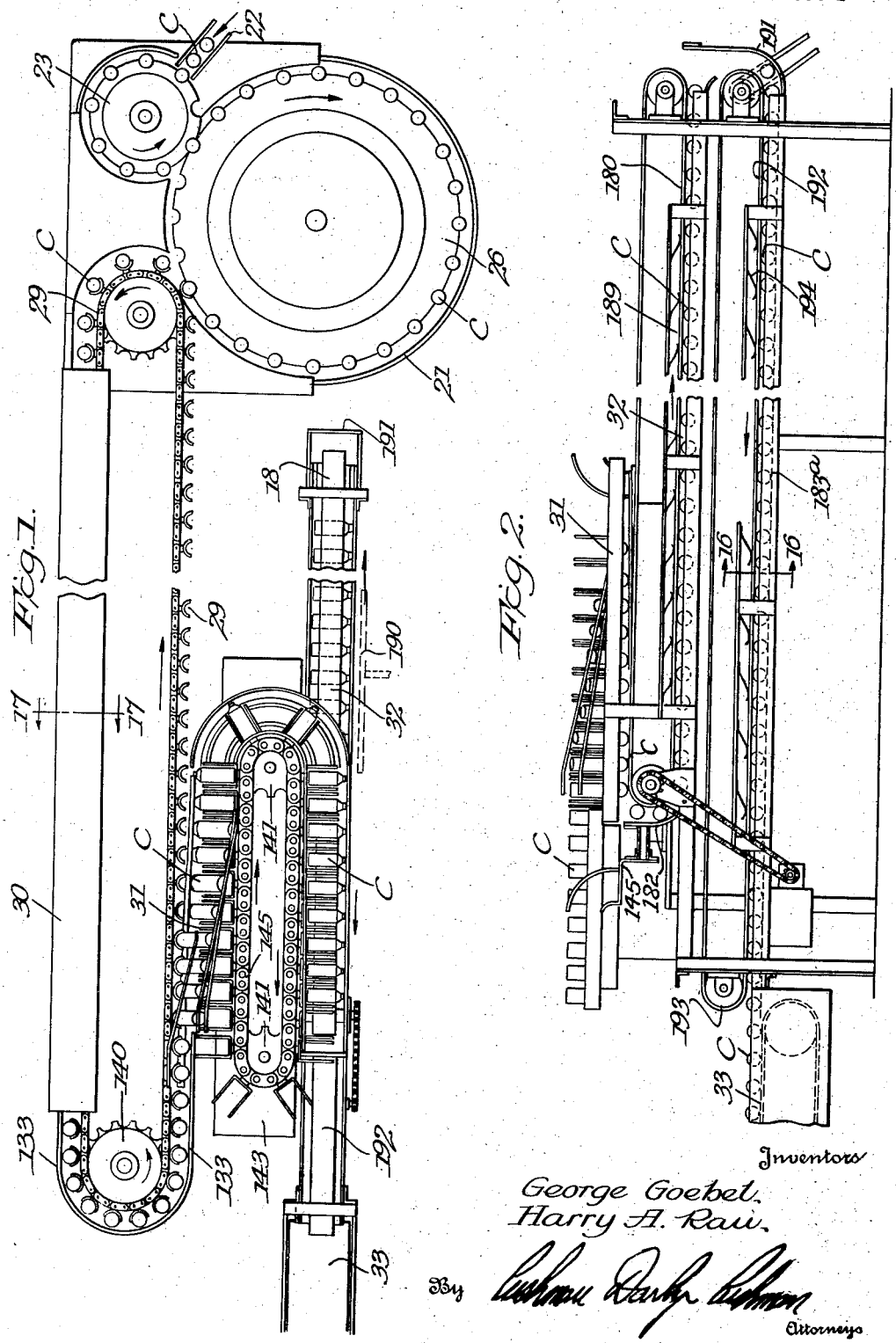
Inventors
George Goebel,
Harry A. Rau,
By
Attorneys

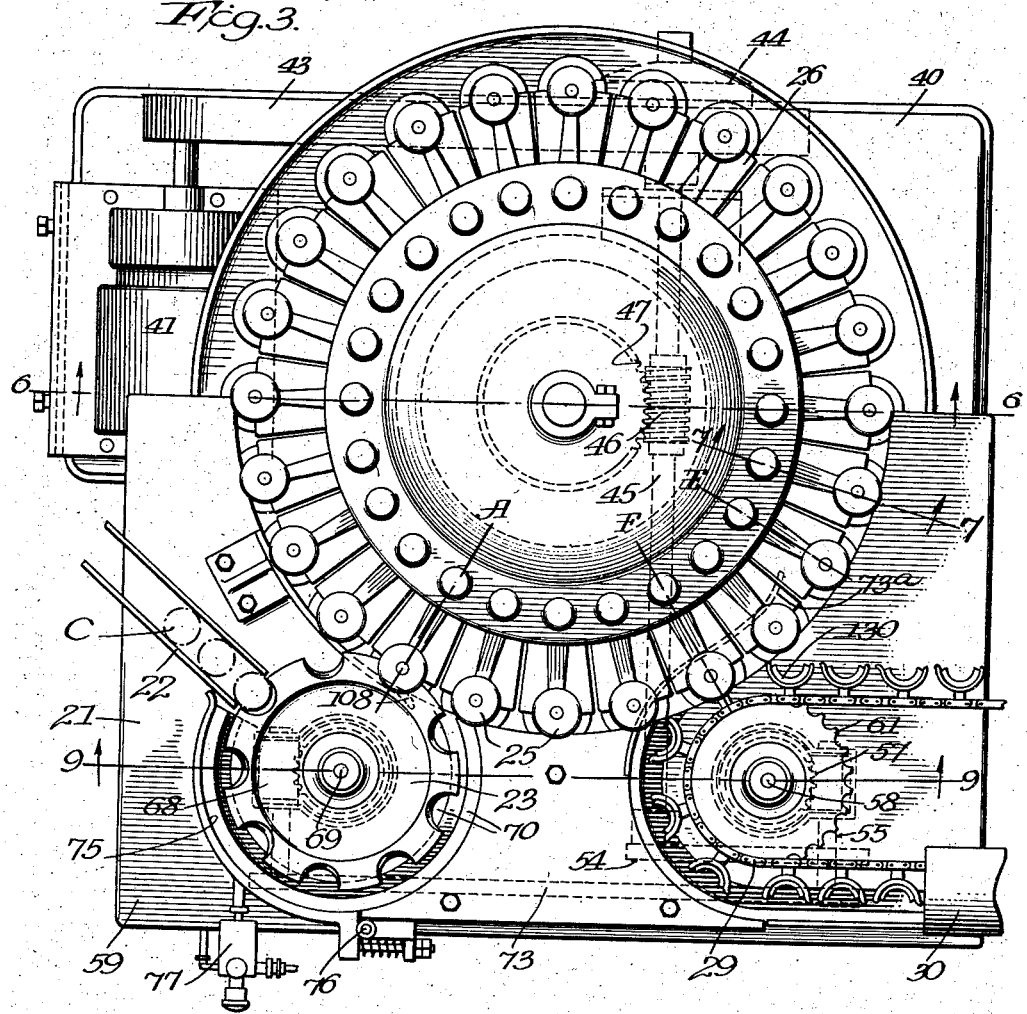

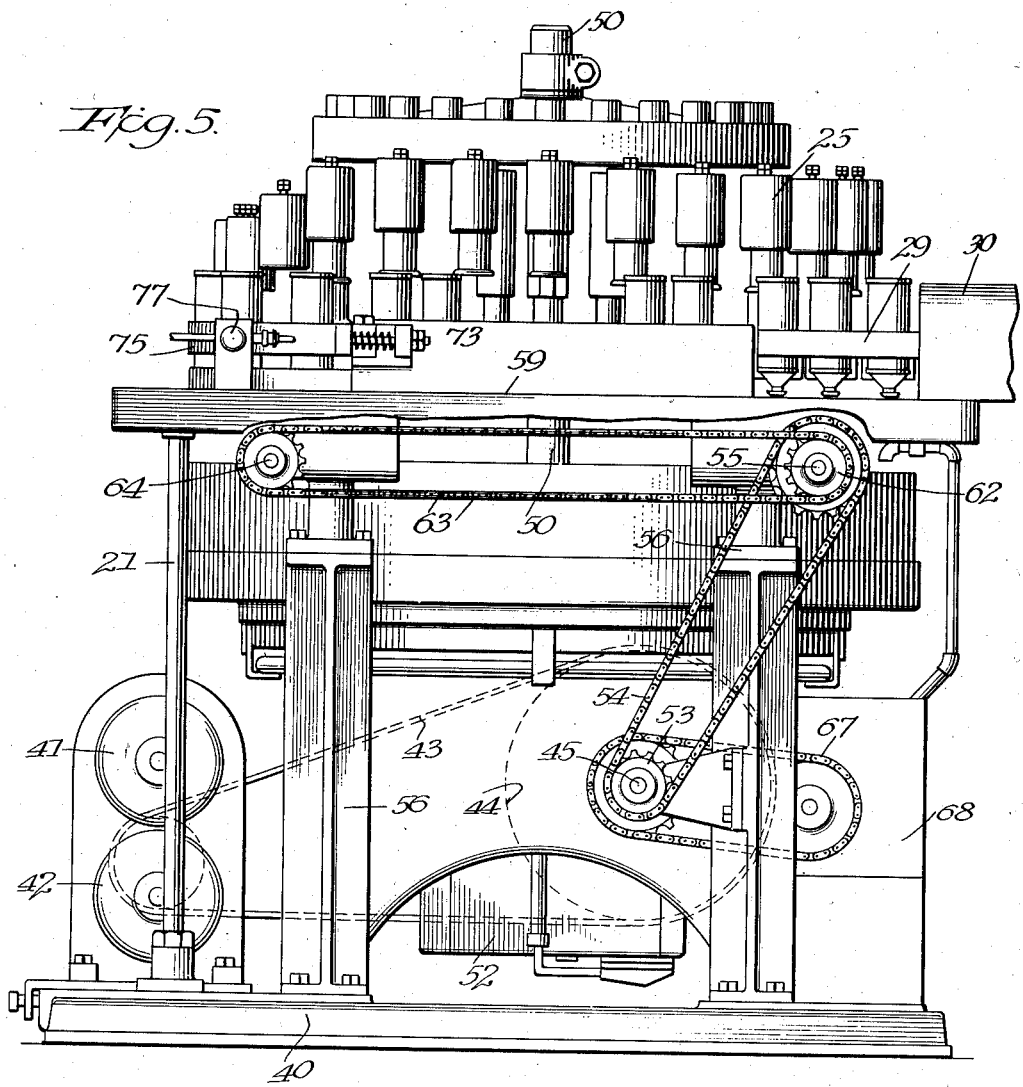

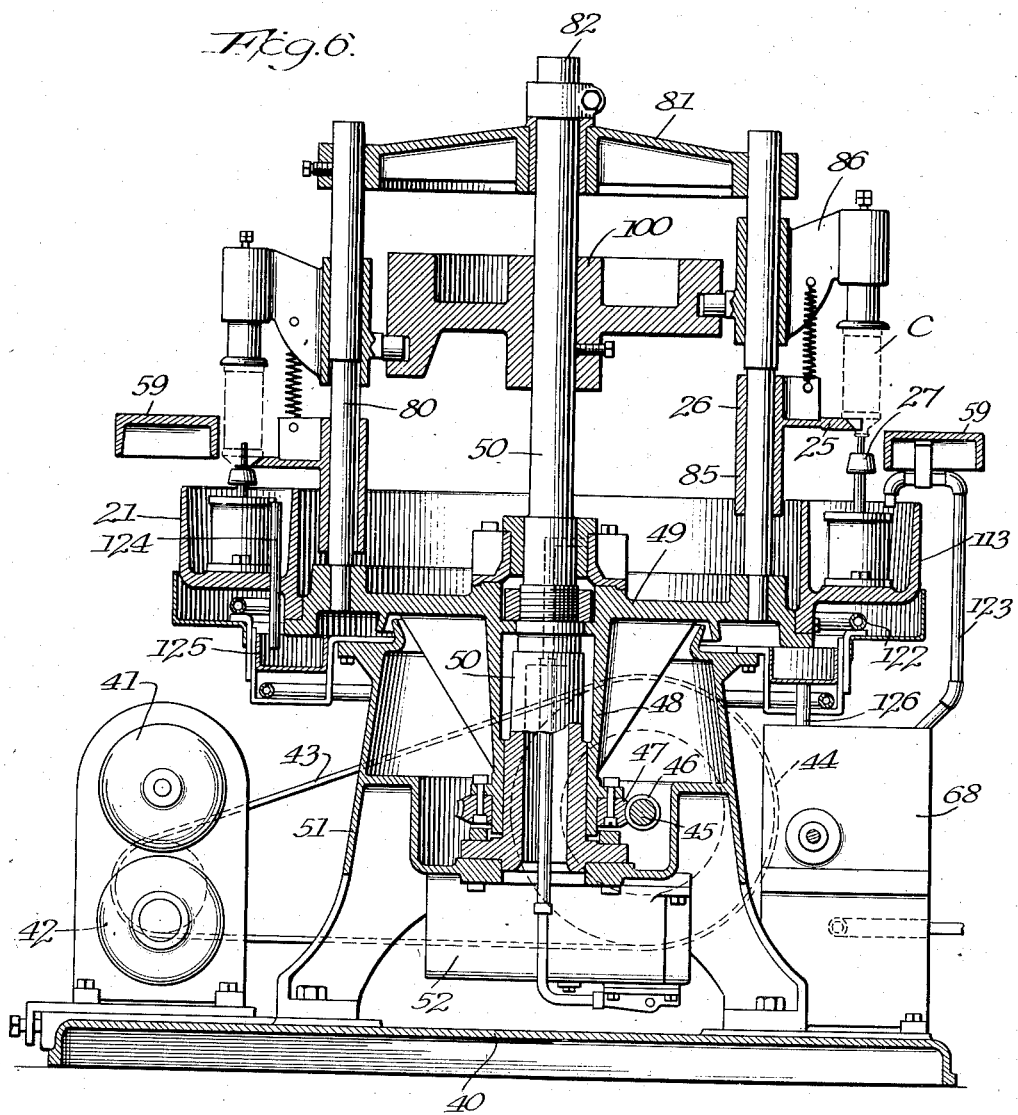

Oct. 7, 1941.  G. GOEBEL ET AL  2,257,740
METHOD AND APPARATUS FOR COATING ARTICLES
Filed July 2, 1937  9 Sheets-Sheet 5
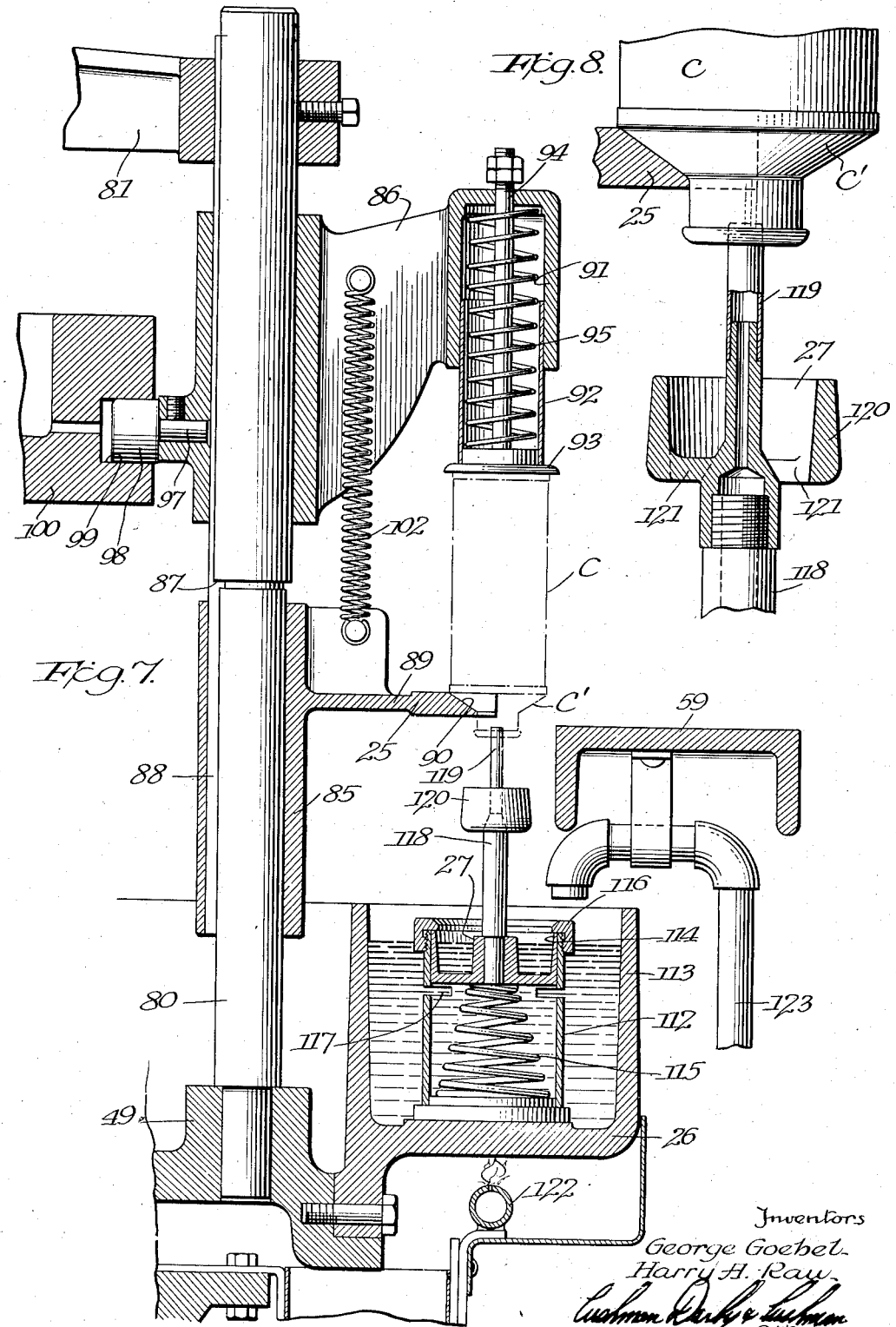
Inventors
George Goebel
Harry H. Rau
Cushman Darby & Cushman
Attorneys

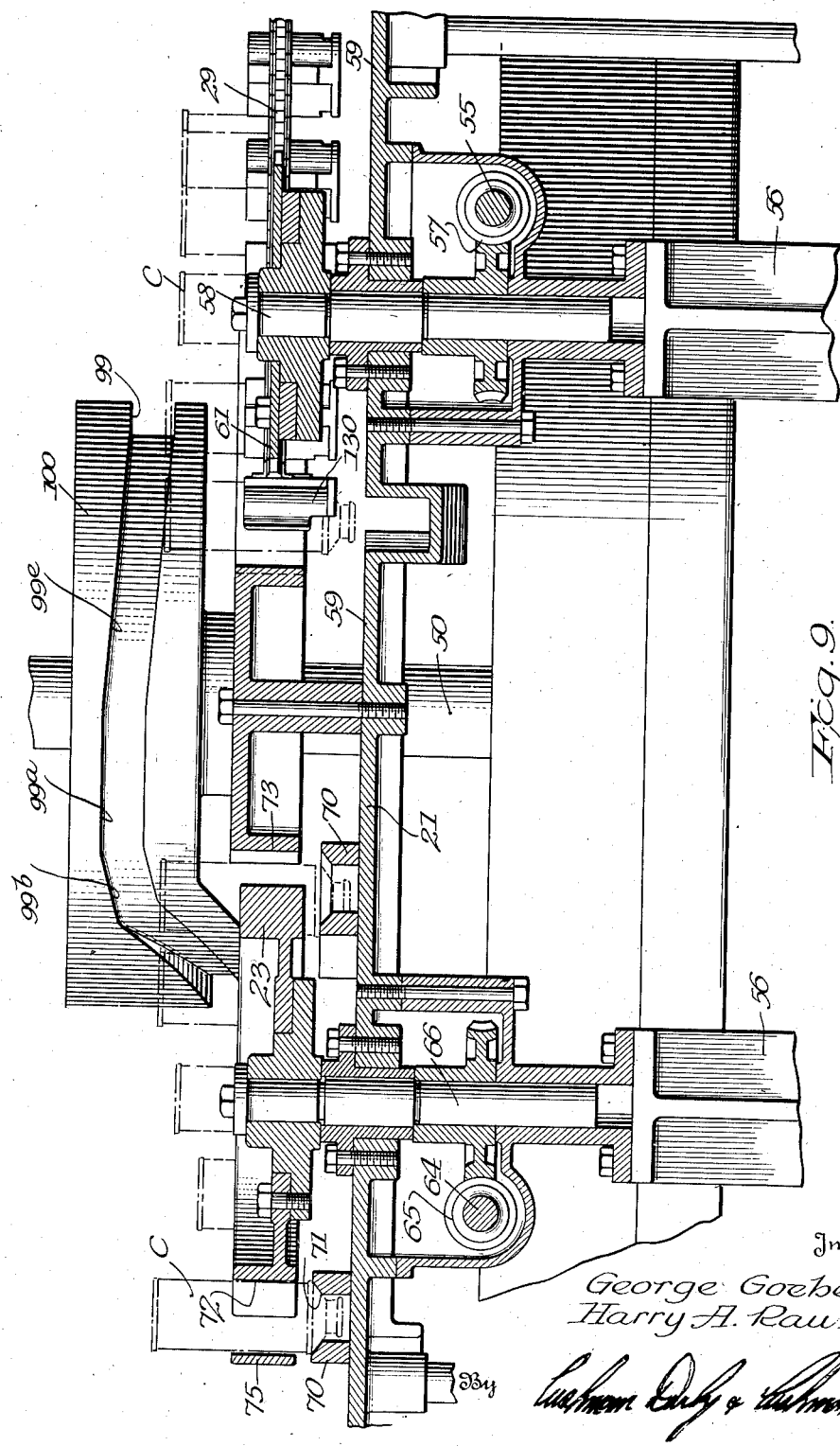

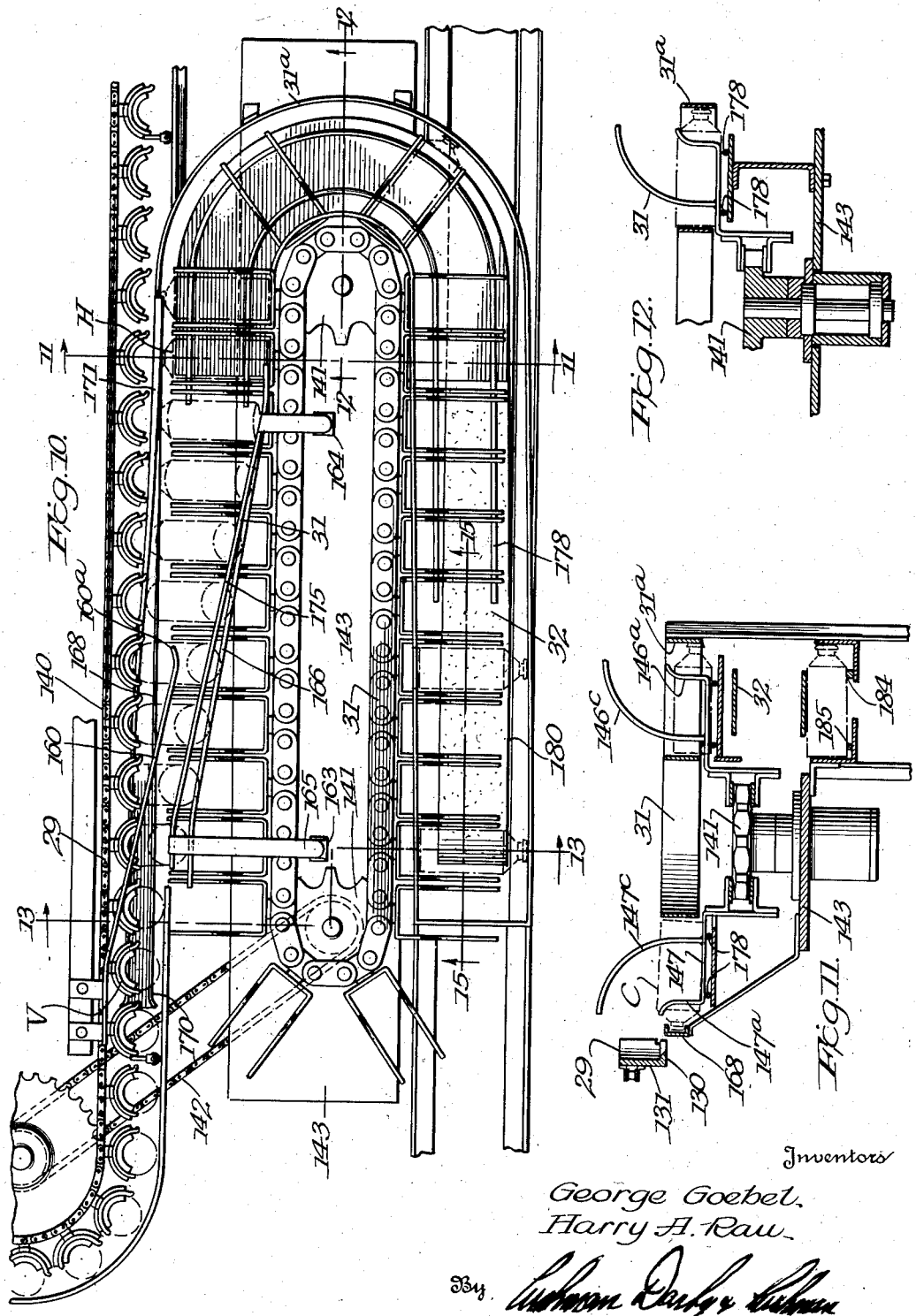

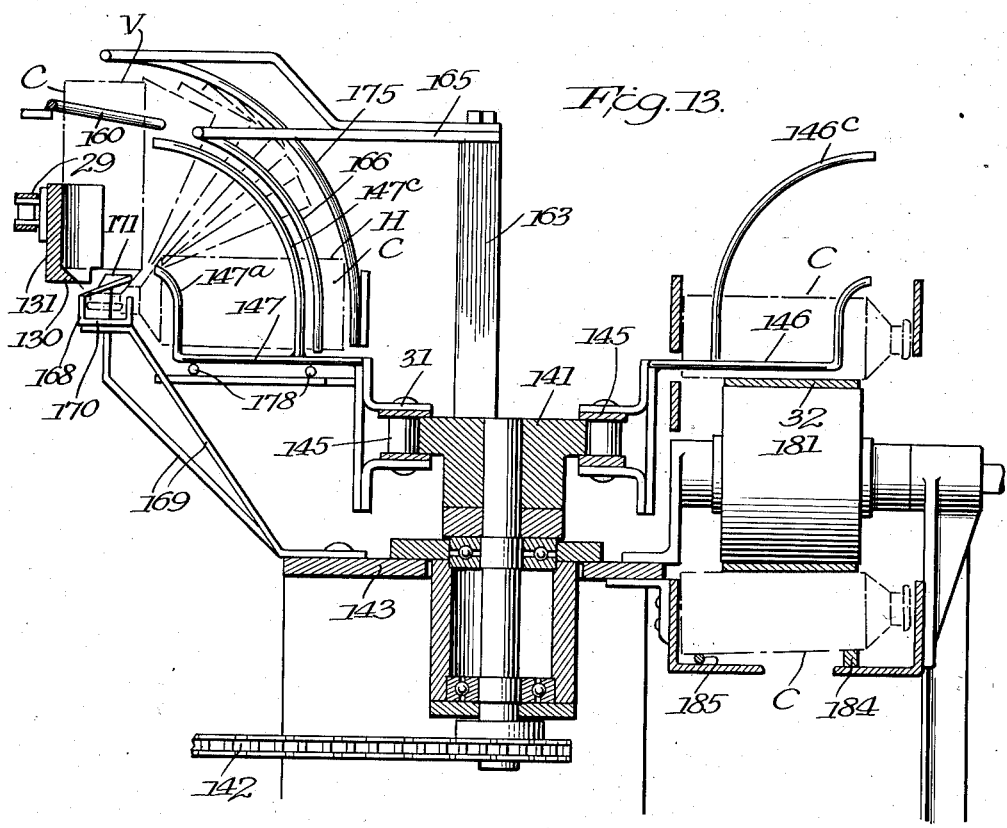
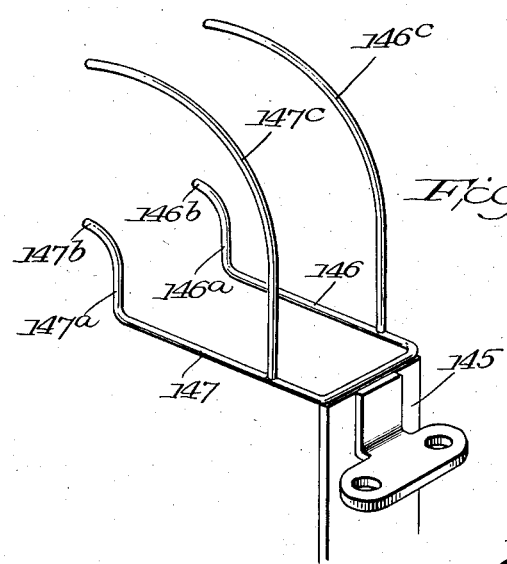

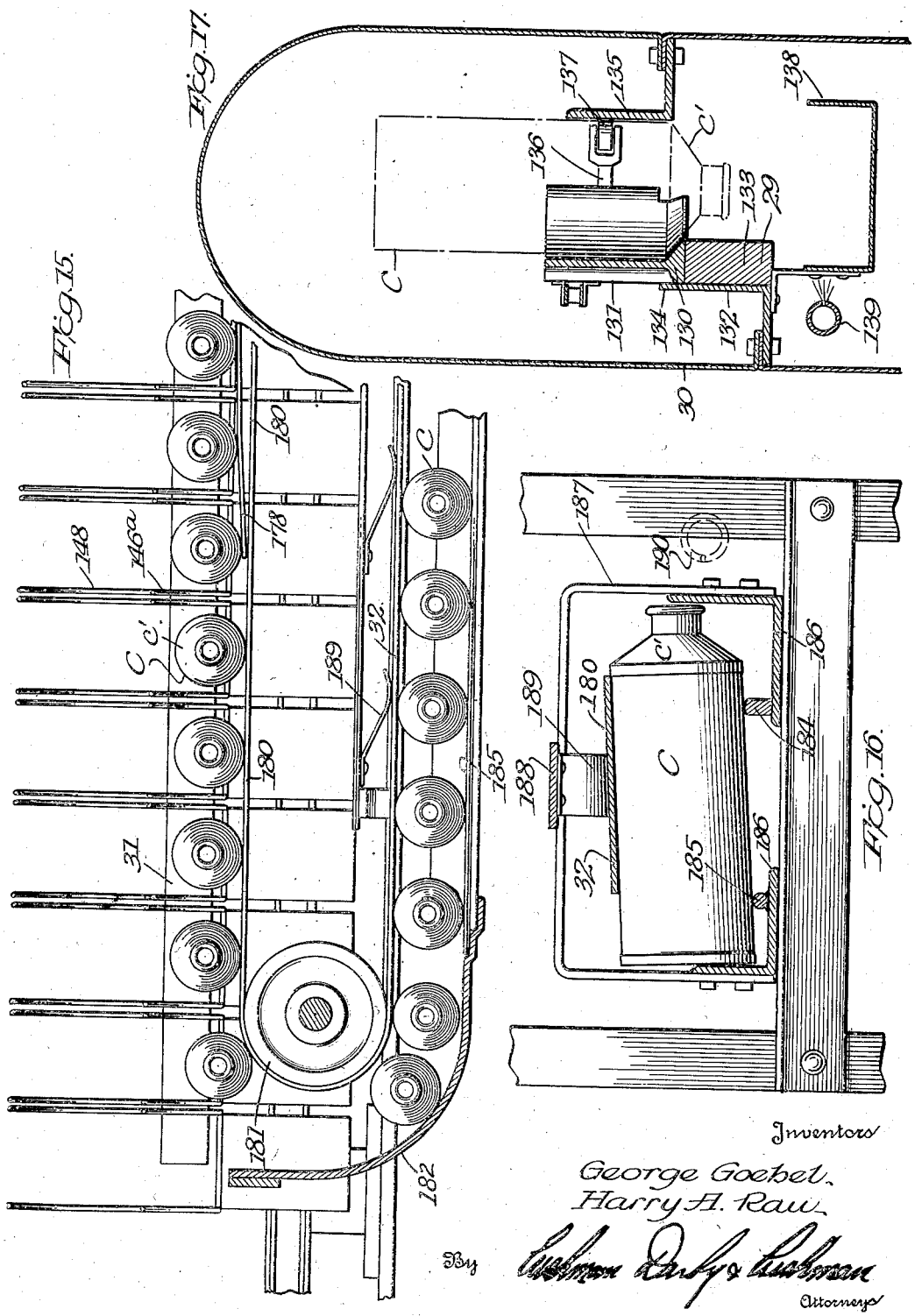

Patented Oct. 7, 1941

2,257,740

UNITED STATES PATENT OFFICE 2,257,740

METHOD AND APPARATUS FOR COATING ARTICLES

George Goebel and Harry A. Rau, Baltimore, Md., assignors to Crown Cork & Seal Company, Inc., Baltimore, Md., a corporation of New York Application July 2, 1937, Serial No. 151,758

14 Claims. (Cl. 91—55)

The present invention relates to a method and apparatus for coating articles.

The principal object of the invention is to provide a method and apparatus whereby a coating substance may be applied to a desired portion of an article, and whereby the article will be maintained in such position during the drying and hardening of the coating that the coating will be evenly distributed on the desired portion thereof.

In coating the interiors of numerous hollow articles it is desirable to prevent the coating from flowing out of the article and upon the exterior surface.

An important object of the present invention is to provide an apparatus and method of coating the interior of an article and to maintain the article in such position during drying of the coating that the coating will be evenly distributed upon the desired portion of the interior, but no coating will reach the exterior of the article.

In the production of beer cans it is necessary that the interior of the cans have a coating substance applied thereto to prevent contact of the beer with the metal of the can. In applying such a coating to a can including a frusto-conical top wall, it is of course necessary that the inner surface of the top wall be completely coated. Some difficulty has been encountered in applying a coating over this surface and at the same time preventing coating from flowing outwardly and over the lip of the mouth of the can. When the can has been filled with beer and capped, and is later moved through a pasteurizer, particles of dirt or other foreign matter which accumulate upon the surface of the body of liquid in the pasteurizer may adhere to any coating which has been permitted to flow over the mouth of the container to a point on the lip not covered by the cap. The presence of dirt or other foreign matter at this point is of course undesirable from a sales standpoint and it is therefore of great importance to so apply the coating to the interior of the can that while the inner surface of the top wall of the can will be completely covered with the coating, none of the coating will flow over the lip of the container and reach the outer or side surface of this lip.

An important object of the invention is to provide a container coating method and apparatus which will efficiently and thoroughly coat the interior surface of a container at optimum speed, but with no possibility of coating flowing out of and over the lip of the container to the outer, or side surface of such lip. The invention is also applicable to can bodies to which a top wall has not been applied and to prevent coating from flowing over the top edge of such bodies and upon the exterior surface thereof.

Another object of the invention is to provide an article coating apparatus and method wherein the entire operation will be performed without interrupting the movement of the article.

Another object of the invention is to provide an article coating mechanism wherein the coating applying or projecting means is so controlled that if an article to be coated is not positioned opposite this means, no coating will be projected therefrom.

Another important object of the invention is to provide a coating mechanism which is so designed that if an effort is made to operate the same while the body of coating material used thereby is in a hard and unmelted state, neither the apparatus nor article will be damaged.

Still another object of the invention is to provide a coating method and apparatus which is so designed that all of the surplus coating applied to an article will be removed from the same and returned to the source of supply.

Another object of the invention is to provide means applicable to various apparatuses for use in the handling of articles and which will cause such articles to be moved from one position to another without marring the article or interrupting its movement.

Other objects and advantages of the invention will be apparent from the following specification and accompanying drawings, wherein:

Figure 1 is a general plan view of the apparatus of the present invention.

Figure 2 is a side elevation of the drying mechanism of the apparatus.

Figure 3 is a plan view of the coating mechanism of the apparatus.

Figure 4 is a view diagrammatically illustrating the cam layout of the coating mechanism of the apparatus.

Figure 5 is a front elevation of the coating mechanism of the apparatus, portions being broken away.

Figure 6 is a vertical sectional view on the line 6—6 of Figure 3.

Figure 7 is a detail vertical sectional view on the line 7—7 of Figure 3.

Figure 8 is a detail vertical sectional view of the coating projecting means.

Figure 9 is a vertical sectional view on the line 9—9 of Figure 3.

Figure 10 is a plan view of a transfer mechanism used in the apparatus.

Figure 11 is a vertical sectional view on the line 11—11 of Figure 10.

Figure 12 is a detail vertical sectional view on the line 12—12 of Figure 10.

Figure 13 is a vertical sectional view on the line 13—13 of Figure 10.

Figure 14 is a perspective view of one of the article guiding frames used in the transfer mechanism of the apparatus.

Figure 15 is a longitudinal vertical sectional view on the line 15—15 of Figure 10.

Figure 16 is a vertical sectional view taken on the line 16—16 of Figure 2.

Figure 17 is a vertical sectional view on the line 17—17 of Figure 1.

The apparatus illustrated in the accompanying drawings and the operation thereof may be generally described as follows: Containers or cans C, ordinarily of metal and, with the embodiment of the invention disclosed in the drawings, including a frusto-conical top wall, are moved to the coating mechanism 21 of the apparatus by any suitable infeed conveyor, not shown, and which delivers the cans to a guideway 22 along which they move to an infeed dial 23. Dial 23 rotates to position successive cans upon can supporting elements 25 (Figure 7) spaced about a rotating coating table 26. Each support 25 has a coating projecting device 27 vertically aligned therewith, each coating device including a cylinder and piston. During the rotation of the table 26, the can C will be moved downwardly with its support 25 and about the coating projecting device 27 so that the piston will cause coating material, usually wax, to be projected into the can C. As indicated in Figure 1, continued rotation of the table 26 will carry the successive cans to a draining conveyor 29 which will conduct them through a heated chamber 30. As shown in Figure 17, the cans will be inverted in the chamber 30 so that any surplus wax may drain therefrom. The cans are removed from conveyor 29 by a transfer mechanism 31 (Figure 1) including an endless conveyor provided with elements which will cause the can to be turned from inverted position and to lie in a horizontal plane. The cans move from the transfer mechanism 31 to a drying conveyor 32 and on this latter conveyor the cans are tilted to have their mouths or nozzles slightly raised so that no wax can flow over the lip of the mouth. The drying conveyor 32 moves through a sufficiently long path of travel to enable the wax in the cans to become cool and hard and the cans are subsequently deposited by the conveyor 32 upon a suitable outfeed conveyor 33 from which they may be removed by attendants.

Base structure and drive of apparatus

As best shown in Figures 3, 5, and 6, the can coating mechanism 21 of the apparatus is supported upon a base 40 on which is mounted the driving motor 41 and a suitable gear reducing mechanism 42. A belt 43 driven by the latter mechanism moves about an air release clutch 44 of the type disclosed in the patent of Wiltie I. Gladfelter, No. 2,013,144, issued September 3, 1935. Clutch 44 is connected to the main drive shaft 45 of the machine, which shaft is provided with a worm gear 46 which meshes with a worm wheel 47 secured to a downwardly extending sleeve 48 formed integrally with the circular casting 49 forming the body of the rotary table 26 of coating mechanism 21. The sleeve 48 is journaled for rotation about a stationary post 50 secured to a base standard 51 of the machine, standard 51 having its upper portion bowl-shaped, so that it may contain a body of oil to lubricate the bearing surfaces between the stationary post 50 and rotating sleeve 48. A suitable oil pump 52 may be mounted on the standard 51 of the machine as shown in Figure 6 to provide flow of lubricant to the various elements of the machine.

Referring to Figures 3 and 5, the main drive shaft 45 extends forwardly past worm wheel 47 and its outer end is provided with a sprocket wheel 53 (Figure 5) about which moves a sprocket chain 54 to drive a stub shaft 55 journaled in the upper and stationary framework 56 mounted on base 40. Stub shaft 55, through a worm drive 57 (Figure 9), rotates a vertical shaft 58 extending up through the stationary work table 59 of the machine. A sprocket wheel 61 secured to shaft 58 serves to drive the draining conveyor 29. Stub shaft 55 (Figure 5) also has a sprocket wheel 62 secured thereto which, through a sprocket chain 63, drives a second stub shaft 64 adjacent the infeed side of the machine. Stub shaft 64 carries a worm wheel 65 (Figure 9) by means of which it drives a vertical shaft 66 to which is secured the infeed dial 23 of the machine.

As indicated in Figure 5 the main drive shaft 45 of the machine also, through a chain 67, drives a suitable pump, not shown, which, as hereinafter described, operates in a tank 68 to maintain a supply of molten wax in the coating projecting elements of the machine.

Can coating mechanism

The stationary work table 59 mounted above the base 40 partially surrounds the rotating can coating table 49 as shown in Figures 3 and 6.

As is best shown in Figures 3 and 9, an arcuate track 70 formed of spaced rails having their upper and inner surfaces downwardly inclined as indicated at 71 is secured to the upper surface of stationary work table 59 in such manner that inverted cans moving with the infeed dial 23 will have the cone tops thereof resting on the inclined surfaces of the track.

The dial 23 has pockets 72 formed in its periphery and the side of each can will be engaged by a pocket so that the can will be moved along the track 70 toward the coating table 21, the cans being maintained in the pockets by a guide plate 73 secured to and spaced above the work table 59 as shown in Figure 3. A gate arm 75 surrounds the leftward or infeed portion of dial 23 to form a support or guide for cans in that portion of the dial, arm 75 forming part of a mechanism such as disclosed in the above-mentioned patent of Wiltie J. Gladfelter. Arm 75 has a trip valve 77 positioned in its path of movement which valve is connected with the air clutch 44. By this arrangement, as is disclosed in the Gladfelter patent, the gate element 75 will be swung outwardly and toward valve mechanism 77 if cans become jammed with respect to the dial 23, with the result that the air clutch 44 will be actuated to disconnect the drive to main shaft 45 so that the operation of the machine will be stopped.

Referring to Figures 6 and 7, the central casting 49 of coating table 26 has a plurality of vertical posts 80 circumferentially spaced adjacent its edge, which posts are connected at their upper ends by a spider 81 rotatable on an upward extension of the central and fixed post 50. Each post 80 carries a can supporting element 25 which comprises two brackets 85 and 86, bracket 85 being slidable upon the lower portion of the post and bracket 86 being slidable upon the upper portion. The lower portion of each post is reduced in diameter to provide a downwardly facing shoulder 87 intermediate the length of the post to limit the upward movement of the lower bracket 85. Both brackets engage a key 88 on the corresponding post to prevent their turning with respect to the latter.

The lower bracket 85 includes an outwardly extending arm or flange 89 having a substantially semi-circular seat 90 at its outer edge, which seat is downwardly inclined as indicated in Figure 7 to conform to and partially encircle the conical top of an inverted can.

Bracket 86 includes an arm having a socket 91 at its outer end in which moves a plunger 92, the lower end 93 of the plunger being adapted to conform to the bottom wall of a can. A stud 94 extends upwardly from the bottom wall of the plunger 92 and through an aperture in the upper end of socket 91. The upper end of the stud 94 is provided with lock nuts to limit the downward movement of the plunger with respect to the socket, and a spring 95 positioned within the socket and about the stud tends the plunger to downward position. The purpose of the spring 95 is hereinafter described.

The upper bracket 86 has a pin 97 projecting from its inner face, which pin carries a roller 98 adapted to move in a cam track 99 provided in the periphery of a casting 100 secured to the extension 82 of the central post 50 of the machine. The bracket 86 will thus be moved vertically on the upper portion of post 80 in accordance with the conformation of the cam track. The lower bracket 85 will move upwardly with the upper bracket 86 because of the fact that a coil spring 102 connects the two brackets. However, the upward movement of lower bracket 85 will be limited by the shoulder 87.

As best shown in Figures 7 and 8, the coating projecting device 27 vertically aligned with each can support 25, comprises a cylinder 112 fixed to the bottom of a circular trough 113 which surrounds the edge of the central table casting 49. A piston or impulse member 114 is reciprocably mounted in each cylinder 112, the piston 114 being tended to the upper position shown in Fig. 7 by a coil spring 115, preferably of conical shape, but upward movement of the piston in its cylinder is limited by a collar 116 having a flange overhanging the upper edge of the cylinder. A plurality of slots 117 are circumferentially spaced about the wall of the cylinder 112 at such point that the slots will be immediately below the lowermost edge of the piston 114 when the latter is in uppermost position. A tube 118 extending through the central portion of the piston 114 projects upwardly therefrom, the tube including a nozzle 119 at its upper end. A drain guard 120 is provided upon each tube 118 at a point well below the upper end of the nozzle 119, the drain guard being of sleeve-like form and secured to the nozzle by spaced arms permitting wax to flow downwardly through the guard 120, and the latter serving to direct it into the trough 113.

As best shown in Figure 6, the wax in the trough 113 is kept molten by one or more burners 122 mounted on the stationary portion of the machine and beneath the path of movement of the circular trough. A supply pipe 123 extends from wax tank 68 to deliver wax to the trough, the level of the wax in the trough being held to a predetermined level by one or more overflow pipes 124 having their lower ends opening to a flow trough 125 extending beneath the coating table 26 and communicating with the wax tank 68 through a drain line 126. Burners may be provided beneath the trough 125 and tank 68 to keep the wax therein in melted condition.

*Operation of can coating mechanism*

As the infeed dial 23 brings an inverted can C adjacent the coating table 26, the can C will move into alignment with one of the supports 25 of the latter table and the guide plate 73 will cause the container C to be moved from the infeed dial 23 and positioned on the support 25 of the coating table.

Just prior to the time that a can is placed on one of the can supports 25, the cam engaging roller 98 of that support will be moving in the high portion 99a (Figure 4) of the stationary cam track 99, with the result that the plunger 92 (Figure 7) of upper bracket 86 will be in uppermost position so that the can may be placed on the lower arm 89 of the can support. The lower arm 89 and its bracket 85 will also be in uppermost position, that is, the upper end of bracket 85 will be in contact with the shoulder 87 of the corresponding post 80, but the height of the shoulder with respect to the height of infeed dial 23 is such that the arm 89 will be in horizontal alignment with the can supporting surface of the arcuate trackway 70 beneath infeed dial 23. The spring 95 will of course tend the plunger 92 to lowermost position, but the stop nuts on plunger rod 94 will prevent the plunger from being positioned so far downwardly that the can may strike its lower end 93.

Immediately after a can has been aligned with the supporting arm 89, the cam roller 98 of that support 25 will move downwardly by reason of the downward incline 99b of the cam track 99, causing the plunger 92 to be brought into contact with the uppermost end of the inverted can C as shown in Figure 7. As the table 26 continues its rotation, the continued downward movement of bracket 86 due to drop 99b of the cam will exert pressure upon the can, and this pressure will be transmitted by the can to the bracket 85 to force the latter downwardly toward the wax or other coating projecting device 27.

As the can C is moved downwardly, its mouth will pass downwardly about the nozzle 119 until the lower surface of the lower bracket 85 of the corresponding can supporting element 25 comes in contact with the drain guard 120. Contact of the support with the guard will cause the nozzle and also the piston 114 to be moved downwardly in the cylinder 112 which, as shown in Figure 7, is filled with molten wax. The downward incline 99b of cam track 99 is sufficiently steep that the piston will be moved downwardly rather suddenly so as to cause the wax within the cylinder 112 to be projected upwardly with some force through the nozzle 118 and against the closed uppermost end (the bottom wall) of the container C. Surplus wax will run out of the can and through the drain guard 120 toward the piston 114.

In the event that an effort is made to operate the machine before the wax in the trough 113 is melted, the provision of the spring 95 in the plunger 92 will permit the can and lower bracket 85 to stop their downward movement when the latter contacts with the drain guard 120, thereby preventing injury to the can or the machine.

When the roller 97 has reached the lowest portion of the incline 99b of cam track 99, it will almost immediately move upwardly along the rise 99c, thereby lifting the upper bracket 86. Since the lower bracket 85 is joined to the upper bracket 86 by coil spring 102, the lower bracket will also be moved upwardly and the can will be clamped between the supporting bracket 85 and plunger 92 and the wax may continue to drain from the can. The upward movement of bracket 85 from the guard 120 will enable the nozzle 118 and piston 114 to rise so that the ports 117 in the wall of the cylinder 112 will open to permit wax to flow into the cylinder from the trough 113.

It will be observed that in the draining position of the can described above, the mouth of the can is below the upper end of the tip 119 of a nozzle 118. This arrangement is of importance in that when the piston 114 raises, air will be sucked into the nozzle 118 from above, and the simultaneous flow of wax inwardly beneath the piston through the ports 117 will almost immediately cause the air to be expelled from the nozzle and may cause particles of wax still in the nozzle 118 to be spurted upwardly through the nozzle tip 119. If the mouth of the can were above the tip of the nozzle, this wax would be directed against the outer surface of the mouth of the can. This air would also blow particles of molten wax, which is draining from the can, against the outer surface of the can. Any wax which might accumulate on this portion of the can will tend to pick up particles of dirt during subsequent movement of the filled can through the pasteurization tank after the can has been filled and capped, and the can thus becomes unsightly.

The elements of the machine described immediately above will remain in the position illustrated in Figure 7 so long as the roller 98 is engaged in the level portion 99d of cam track 99, which portion extends along approximately one-half of the path of travel of the table 26. At about the point E indicated on Figure 3, the roller 98 will move upwardly along an incline 99e of cam track 99 so that the upper bracket 86 will be raised, and the lower bracket 85 will be drawn upwardly with the can by the action of spring 102. This rising movement of the upper bracket 86 will continue until approximately the point F on Figure 3 so that when the can has moved opposite point F its mouth will be above and clear of the tip 119 of the nozzle 118. At this moment the upper bracket 86 and the lower bracket 85, with the can between the two, will be opposite one of the can supporting carriers 130 of the draining conveyor 29. Since the upper bracket 86 has now raised sufficiently to lift the plunger 93 out of close engagement with the uppermost end of the inverted can C, the can will be free to move onto the conveyor 29, and this movement will be assisted by the stationary guide bar 73a (Figure 3) which is fixed to the guide plate 73 of the work table 59, elements 73a and 73, together extending behind the can C and about the path of travel of the cans moving on conveyor 29 and around the sprocket wheel 61.

From point F of Figure 3 to point A the roller 98 of the bracket 86 will move along the high portion 99a of cam track 99 so that the bracket and its plunger 93 will be in uppermost position and in readiness to receive a second can from the infeed dial 23.

Can draining and drying conveyors

The can which has been placed upon draining conveyor 29 will move into the draining chamber 30 which extends along and encloses the front run of conveyor 29. As best shown in Figures 10 and 17, each link of the conveyor 29 is provided with a carrier 130 which includes an upstanding wall 131 having its inner portion shaped to partially encircle and extend beneath an inverted can to support the same as shown in Figure 17. The conveyor chain 29 moves upon a track 132 in the draining chamber 30 as shown in Figure 17, track 132 comprising a horizontal bar 133 on which the conveyor links bear, and a vertical and rear portion 134 which guides the conveyor in a straight line and so that the can C will be held in contact with a guide bar 135 provided on the opposite wall of the draining chamber 30.

Arms 136 spaced along the conveyor 29 are provided with rollers 137 at their outer ends which bear on the guide bar 135 to hold the links of conveyor 29 spaced therefrom. A drain trough 138 extends beneath the path of travel of conveyor 29 in chamber 30 to receive wax draining from the inverted cans, and a burner pipe 139 is provided to maintain the wax in the trough in molten condition so that it may flow back into the wax tank 125 (Figure 6) of the coating machine, the trough 138 being suitably inclined for the latter purpose. The burner 139 also serves to heat the entire draining chamber 30 with the result that the wax will not be permitted to harden in the cans while passing through this chamber. By maintaining the cans in a heated condition, all surplus wax will flow from the same, leaving only a thin layer of wax upon the interior of the cans.

If desired, the chamber 30 may be heated by steam pipes or other closed heating elements, instead of by an open flame, the degree of heat being sufficient to maintain the wax in a molten state for draining. The use of steam pipes or other closed heating elements obviates the possibility of the cans becoming burned if the conveyor 29 should be stopped.

The can transfer and turning mechanism

As best shown in Figure 1, the draining chamber 30 extends the length of the forward run of the draining conveyor 29, and at the outlet end of the chamber the carrier links of the chain still move along trackway 133 with the cans bearing against a guide 135.

In order to transfer the inverted cans from the draining conveyor 29 to the drying conveyor 32 and position them in a substantially horizontal position on the latter conveyor, the cans moving along the inner run of conveyor 29 are engaged by a transfer conveyor 31.

As indicated in Figure 1, the transfer conveyor 31 moves about sprocket wheels 141 and is operated from a suitable source of power through a sprocket chain 142 from a shaft of conveyor 29. The shafts carrying the sprocket wheels are journaled in a base-plate 143 (Figure 13) and the conveyor 31 moves above this plate.

Referring to Figures 13 and 14, each link 145 of transfer conveyor 31 is provided with two spaced and horizontal arms 146 and 147, respectively, arm 146 being the leading arm with respect to the movement of conveyor 31 and arm 147 being the trailing arm. The outer ends of arms 146 and 147 are sharply bent to be upstanding, as indicated at 146b and 147b. The arms 146 and 147 are also respectively provided with outwardly curved and overhanging arms 146c and 147c as best shown in Figure 14, these arms being spaced from the upstanding portions 146a and 147a, a distance somewhat less than the length of the body of the cans to be handled. The distance between the leading arm 146 and trailing arm 147 is at least as great as the diameter of the cans to be handled, and the spacing between the overhanging arms 146c and 147c corresponds to that between horizontal arms 146 and 147.

The purpose of the spaced arm structure on each link 145 is to vertically guide the downward movement of the cans from their vertical position shown at position V in Figure 13 to the horizontal position shown at H in the same figure. A can is caused to move from the first of these positions to the latter position by contact of the inner side (the left-hand side in Figure 13) of a can at position V on the draining conveyor 29 with a rod 160 which, as indicated in Figures 10 and 13 is downwardly and outwardly inclined with respect to the inner run of conveyor 29 so that as the cans move along the arm 160 they will fall or be brushed outwardly from the conveyor 29 and between the arm structures on each of the links 145 of transfer conveyor 31.

The base plate 143 of the transfer conveyor 31 has an upstanding post 163 secured thereto adjacent the end at which cans are received from draining conveyor 29, and a post 164 is secured to the base plate adjacent the other end of the conveyor. As shown in Figure 13, post 163 is provided with an arm 165 extending outwardly over the arm structures on the links 145, the outer end of this arm being so formed and positioned that a can contacting with the pusher rod 160 will be received and supported and gradually permitted to drop over from position V to position H. In order to accommodate this movement of the can, the receiving rod 166 extends substantially parallel to the pusher rod 160, but is also bowed downwardly with respect to rod 160 as best indicated in Figure 13. It will be noted from Figure 10 that the receiving arm 166 extends somewhat past the free end 160a of pusher arm 160. Obviously, after a can has been tilted sufficiently far outwardly from the conveyor 29 by pusher rod 160, it will rest directly upon the receiving rod 166 so that the latter rod will entirely control its further movement toward the horizontal, and pusher rod 160 therefore need only be sufficiently long to tilt the can to lie upon the receiving rod 166.

The movement of the cans from position V to position H is also assisted by a U-shaped guide-bar or track 168 provided beneath the run of draining conveyor 29 adjacent the transfer conveyor 31. As shown in Figure 13, guide-bar 168 is supported upon arms 169 extending from the base plate of transfer conveyor 31, and the nozzles of the cans C being moved in the guide-bar. The infeed end 170 of the guide-bar faces upwardly as illustrated in Figures 10, 11 and 13, but the guide-bar is twisted longitudinally so that at its outfeed end 171 it lies in a vertical plane. Since the necks of the cans will be moving in the guide-bar 168, the entire can will thereby be tended from vertical position to horizontal position. It will be observed that shortly after a can has moved from position V in Figures 10 and 13 its shoulder will move out of contact with the carrier 131 of draining conveyor 29 and that from this point onward the can will be bodily supported by the guide-bar 168 and the receiving rod 166.

In order to prevent cans from being thrown bodily outward from the guide-bar 168, a can end engaging rod 175 is also supported by the post 163, the rod 175 substantially conforming in longitudinal outline to the receiving rod 166, but being positioned above the latter rod as best indicated in Figure 13, so that the closed ends of the cans will contact therewith during their movement from position V to position H.

The movement of transfer conveyor 31 is so synchronized with the movement of draining conveyor 29 that during the operation of the conveyor, a link 145 of the transfer conveyor will be aligned with each carrier link 130 of conveyor 29. As a result, a can pushed from a carrier link of conveyor 29 by pusher rod 160 will move between the overhanging arms 146c and 147c of a link 145 on the transfer conveyor. When the can has swung so far outwardly from the carrier link 130 that it is out of contact with such carriers, it will be moved forwardly by the trailing arms 147a and 147c of the arm structure of the aligned link 145. Thus, the can will be moving forwardly and with the conveyors during the entire time that it is being moved from vertical to horizontal position.

When the can reaches position H it will be received upon horizontal bars 178, which, as shown in Figure 10, extend beneath the path of travel of the arms of the links 145. From this point the trailing arms 147b and 147c will cause the cans to roll on the bars 178 and about the right-hand end (Figure 10) of the path of transfer conveyor 31 and along the inner run of that conveyor, the cans being held in the carriers of conveyor 31 by a guide plate 31a. As best shown in Figure 10, the bars 178 terminate approximately midway of the inner run (the lower run in Figure 10) of transfer conveyor 31 and when the cans have reached the ends of the bars 178 they will drop very slightly downwardly between the arms of link 145 as is shown in Figure 15 to lie upon and move with a conveyor belt 180. The adjacent end of conveyor belt 180 moves down about a pulley 181 and the cans are guided downwardly and about the pulley by a chute or guide 182 preferably formed of leather, canvas, or similar heavy but relatively flexible material.

The chute 182 terminates beneath the pulley and from this point onward the cans move on a trackway 183 formed of spaced bars 184 and 185, bar 185, beneath the closed or bottom end of the can, being of less height than the bar 184. The lower run of belt 180 will bear upon the upper surfaces of the cans to roll them along the two strips. As best shown in Figure 16, the use of higher bars 184 beneath the nozzle ends of the cans will cause the mouths of the cans to be slightly raised, this arrangement insuring that such surplus wax as may be still in the can will flow to its closed and lower end so that no wax may flow over the lip of the can.

Spaced and facing angle irons designated by the numeral 186 guide the can along the strips 184 and 185 and, at spaced points, brackets 187 extend upwardly from the angle irons 186, these brackets serving to support longitudinally extending bars 188 having leaf springs 189 secured to their under sides, the leaf springs extending parallel with the lower run of belt 180 and in the direction of its travel to exert a slight pressure upon the belt to hold it in contact with the upper surfaces of the cans.

A gas burner 190 may be positioned adjacent the portion of the trackway 183 upon which the cans are first received, the burner also being positioned near the nozzle ends of the cans. The purpose of this heating means is to cause any surplus wax in the mouth of the can to be melted so that it will flow back into the body of the can. However, burner 190 only extends along the trackway 183 for a comparatively short distance, and through the remainder and the greater part of the movement of cans on such trackway, they will be permitted to cool so that the wax will harden while the cans are still slightly tilted.

Referring to Figures 1 and 2, it will be noted that as the cans move from beneath the lower run of belt 180 they will drop downwardly through a chute 191 and will then move beneath the lower run of an endless belt 192 to the outfeed end 193 of the apparatus. The lower run of belt 192 is pressed downwardly upon the upper surfaces of the cans by leaf springs 194 mounted in a manner similar to the leaf springs 189 of belt 180, and the cans move upon a trackway 183 so that the nozzles of the cans will be slightly raised in a manner similar to that shown in Figure 16. At the outfeed end 193 of the machine the cans move upon a conveyor 33 from which they may be removed by attendants.

It will be obvious from the foregoing description of the apparatus set forth in the drawings that the invention is applicable for the coating of articles of numerous types and that the description herein of the construction and use of an apparatus for coating the interiors of containers is merely to illustrate and disclose one embodiment of the apparatus and method of the invention.

Structure disclosed but not claimed herein is claimed in the divisional application of Helene Goebel, administratrix of the estate of George Goebel, deceased, and Harry A. Rau, Serial No. 391,804, filed May 3, 1941, for Article handling apparatus.

We claim:

1. The combination in a coating apparatus, of means to support an open-ended article in inverted position, means to project coating composition upon the interior of the article, means to support the article in inverted position to drain, means to turn the article to a substantially horizontal position, and means to support the article in the last-named position so that the coating may dry.

2. The combination in a can coating apparatus, of means to support a can, means to project coating composition upon the interior of the can, conveyor means to remove the can from said supporting means and to support the can in inverted position for draining, and means to roll the can about its longitudinal axis during drying of the coating to cause the coating to be evenly distributed upon the can interior.

3. In combination, means to support a can coated upon its interior with an open end downwardly so that surplus coating may drain therefrom, and means to receive the can from said first-named means and to support it slightly tilted from a horizontal position and with its open end upward during drying of the coating so that the coating will not flow from the open end of the can.

4. In combination, means to support a can coated upon its interior with an open end downwardly so that surplus coating may drain therefrom, and means to receive the can from said first-named means and to support the can slightly tilted from a horizontal position and with its open end upward during drying of the coating so that the coating will not flow from the open end of the can, and to roll the can during such movement.

5. The combination in a coating apparatus, of a container for coating, a piston member including a coating projecting nozzle reciprocable with respect to said container, and article supporting means to move the article into a position to surround the piston nozzle and actuate the piston to force coating from said container and through said nozzle upon the article.

6. The combination in a coating apparatus, of means to support an article in inverted position, a container for coating positioned beneath said supporting means, a piston member including a coating projecting nozzle reciprocable with respect to said container, and means to move said supporting means into contact with said piston member to force coating from said container and through said nozzle into the article.

7. The combination in a coating apparatus, of coating projecting means including an actuating member, a vertical post, an article supporting element slidable on said post, an article gripping element slidable on said post, and means to move said elements with an article between them downwardly on said post against the coating projecting means actuating member and to return said elements and article to raised position and separate said elements so that the artice may be removed therefrom.

8. The combination in a container coating apparatus, of means to support a container in inverted position, a plunger adapted to bear on the uppermost end of the container while the container is supported by said first-named means, a source of coating, a piston in said source of coating including an upwardly projecting nozzle, and means to move said supporting means and plunger means to move the container downward about said nozzle and bring said supporting means into contact with said piston to move the latter downwardly in the source of coating and thereby cause coating to be projected upwardly into the container through said nozzle.

9. The combination in a coating apparatus, of coating projecting means including a piston member, means to support an article and move with the same into contact with said piston member to cause coating to be projected into the article, said last-named means including a take-up element so that should the piston member be momentarily immovable, the article may move relative to the article supporting means.

10. A method of coating a can comprising applying coating to the interior of the can through an opening therein, supporting the can with the opening downward for draining, and subsequently moving the can while its longitudinal axis is in a substantially horizontal plane for drying of the coating.

11. A method of coating the interior of a hollow article open at one end comprising projecting coating into the open end of the article, maintaining the article with its open end downward and in the presence of heat to permit surplus coating to drain through such open end, and subsequently maintaining the article with its longitudinal axis substantially horizontal but inclined upwardly toward the open end of the article to permit the coating to dry and so that no surplus coating will flow over the lip of the open end of the article.

12. A method of coating the interior of a hollow article open at one end comprising projecting coating into the open end of the article, maintaining the article with its open end downward and in the presence of heat to permit surplus coating to drain through such open end, and subsequently maintaining the article with its longitudinal axis substantially horizontal but inclined upwardly toward the open end of the article to permit the coating to dry and so that no surplus coating will flow over the lip of the open end of the article, and rotating the article in the last-named position to cause the coating to be evenly distributed during drying.

13. A process of coating the interior of an article having one open end comprising projecting coating into the open end of the article, maintaining the article with its open end lowermost and in the presence of heat to cause surplus coating to drain directly downwardly through the open end of the article, maintaining the article with its longitudinal axis inclined upwardly from the horizontal toward the open end of the article for drying of the coating and so that the surplus coating will not flow over the lip of the open end of the container, heat being applied when the article is initially positioned in the last-mentioned position to cause surplus coating to readily flow inwardly from the open end of the article.

14. The combination in a can coating apparatus, of means to support a can, a chamber for coating material, a piston movable in the chamber to project coating upon the interior wall of a can, said piston including a nozzle, means to deliver a can to said support, and means to move said support toward said piston to place the can in a position to surround the piston nozzle and to move said support against said piston to move the latter inwardly of said chamber to force coating through the piston nozzle and then move out of contact with the piston to enable the latter to move outwardly of the chamber, said last-named means acting to hold the can in a position to surround the piston nozzle until the piston has completed such outward movement.

GEORGE GOEBEL.
HARRY A. RAU.